United States Patent [19]
Horie

[11] Patent Number: 5,841,894
[45] Date of Patent: Nov. 24, 1998

[54] THREE-DIMENSIONAL DETECTING METHOD AND THREE-DIMENSIONAL DETECTING APPARATUS

[75] Inventor: Masahiro Horie, Kyoto, Japan

[73] Assignee: Dainippon Screen Mfg. Co., Ltd., Kyoto, Japan

[21] Appl. No.: 730,230

[22] Filed: Oct. 15, 1996

[30] Foreign Application Priority Data

Oct. 16, 1995 [JP] Japan ................................. 7-267201

[51] Int. Cl.$^6$ .......................... G06K 9/00; G01B 11/24
[52] U.S. Cl. .......................................... 382/154; 356/376
[58] Field of Search .................................. 382/154, 153, 382/203; 345/139, 419, 425, 429, 432; 356/375, 376

[56] References Cited

U.S. PATENT DOCUMENTS

| | | | |
|---|---|---|---|
| 4,700,398 | 10/1987 | Mizuno et al. | 382/108 |
| 4,707,610 | 11/1987 | Lindow et al. | 356/376 |
| 5,444,537 | 8/1995 | Yoshimura et al. | 356/376 |
| 5,737,084 | 4/1998 | Ishihara | 356/376 |

Primary Examiner—Leo H. Boudreau
Assistant Examiner—Bhavesh Mehta
Attorney, Agent, or Firm—Ostrolenk, Faber, Gerb & Soffen, LLP

[57] ABSTRACT

With three-dimensional detecting method and a three-dimensional detecting apparatus, it is possible to accurately detect a surface shape of a sample. While moving a sample, confocal images Fj (where j=1, 2, . . . , n) are taken at a plurality of heights which are different from each other in the direction of height. Based on the confocal images Fj, surface height data H(x, y) with which the quantity of light becomes maximum in the height direction are calculated on each pixel (x, y), and further, a maximum light quantity I(x, y) with the surface height data H(x, y) are calculated. For each pixel, the surface height data H(x, y) of a pixel under noise processing (x, y) are corrected based on surface height data H(a, b) and a maximum light quantity I(a, b) at peripheral pixels which surround the pixel under noise processing (x, y).

14 Claims, 10 Drawing Sheets

FIG. 4A
LOWER LIMIT POSITION D(1)
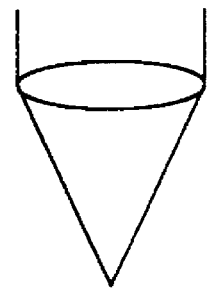
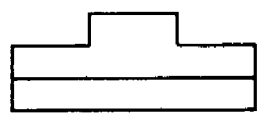
FIG. 4B
UPPER LIMIT POSITION D(n)
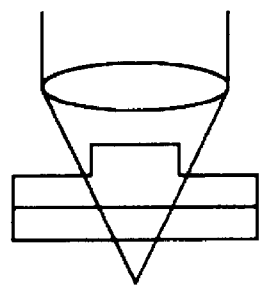

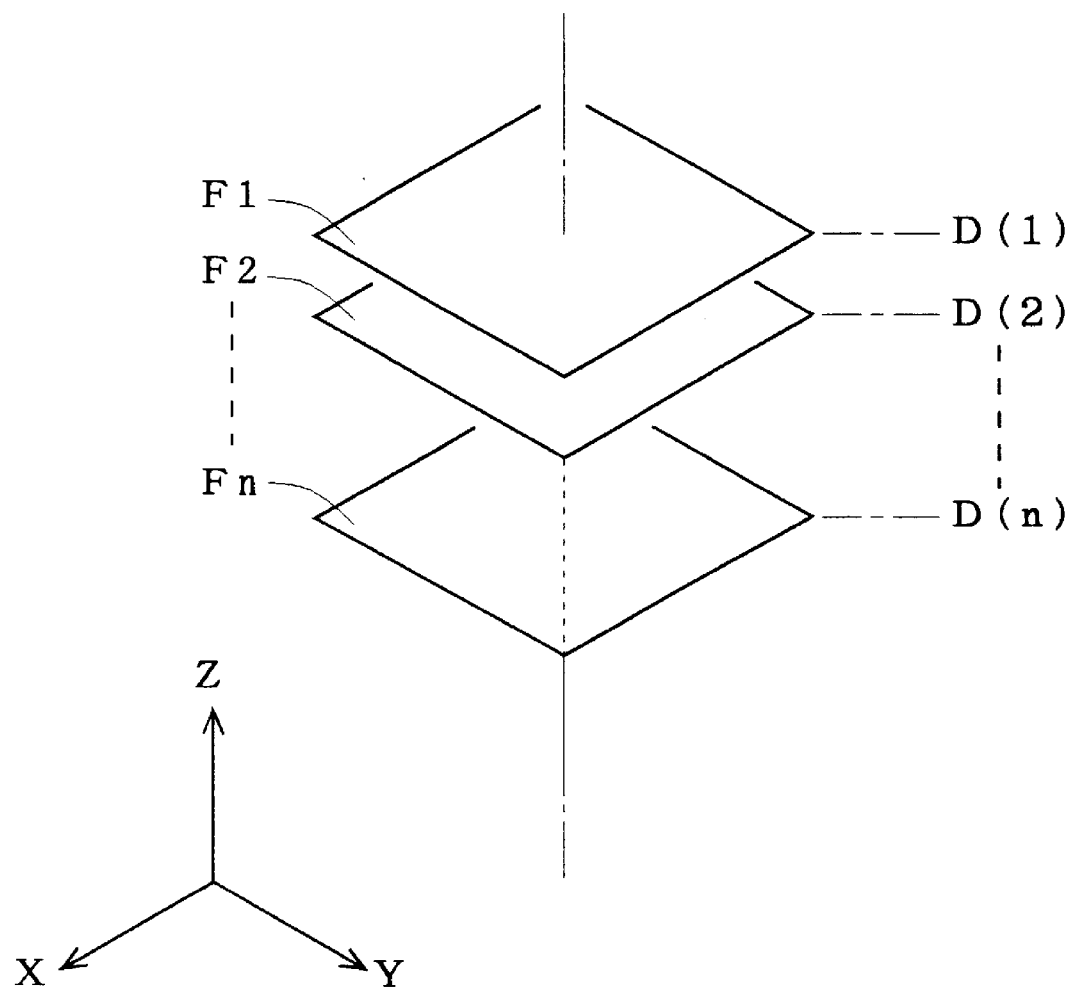

F I G. 7

| (H(x−1,y−1), I(x−1,y−1)) | (H(x,y−1), I(x,y−1)) | (H(x+1,y−1), I(x+1,y−1)) |
| --- | --- | --- |
| (H(x−1,y ), I(x−1,y )) | (H(x,y ), I(x,y )) | (H(x+1,y ), I(x+1,y )) |
| (H(x−1,y+1), I(x−1,y+1)) | (H(x,y+1), I(x,y+1)) | (H(x+1,y+1), I(x+1,y+1)) |

# THREE-DIMENSIONAL DETECTING METHOD AND THREE-DIMENSIONAL DETECTING APPARATUS

BACKGROUND OF THE INVENTION

1. Field of the Invention

The present invention relates to a three-dimensional detecting method and a three-dimensional detecting apparatus in which confocal point images at a horizontal plane consisting of a plurality of pixels are taken at a plurality of heights which are different from each other in the direction of the height of a sample object and surface information of the sample object is obtained based on the plurality of the confocal point images.

2. Description of the Related Art

In recent years, in technical fields related to production of a semiconductor device and a liquid crystal device, as a device has become denser and manufacturing steps have become more complex, the need for observing and detecting a three-dimensional structure of a surface of a substrate has been mounting. This is because three-dimensional observation of a device makes it easier to grasp manufacturing steps and makes it possible to identify the type of a defect which is created in the device and a cause of the defect. Meanwhile, in technical fields related to biotechnology as well, as an interest on a three-dimensional structure of a cell and a molecule has increased, the need for observing and detecting three-dimensional structures of a cell and a molecule has been mounting.

To satisfy these needs, a confocal point microscope utilizing the principles of confocal point has been proposed. For instance, a conventional confocal point microscope is constructed to take confocal point images at a horizontal plane at a plurality of heights which are different from each other in the direction of the height of a sample object while moving the sample object in the direction of the height. An optical axis position, i.e., a height position in the direction of the height, at which the quantity of light is maximum is calculated for each pixel and used as surface information which expresses a surface of the sample object.

Further, while detecting the sample object three-dimensionally, a surface shape of the sample object is displayed in a display part such as a CRT based on the surface information which is obtained from detection so that an operator can observe the shape.

While the three-dimensional detection above requires to calculate the quantity of light returns along an optical axis after reflected by a surface of a sample object and to determine a height position at which the reflected light quantity is maximum as the surface of the sample object, if the surface of the sample object includes a steep slope portion or a region which easily absorbs light (e.g., black region), the light quantity becomes maximum at a height position which is not the surface of the sample object and therefore a detection result is not accurate. This is because since light reflected by the slope portion is guided in a direction which is off the optical axis, the quantity of light which returns along the optical axis is reduced in the former case (where there is a slope portion), and because the reflected light quantity itself at the surface of the sample object is reduced in the latter case (where there is a light absorbing region). Thus, with three-dimensional detection of a sample object by means of a conventional confocal point microscope, a detection result varies depending on whether there is a slope portion in the surface of the sample object, etc., and therefore, it is impossible to accurately detect the surface of the sample object. If a three-dimensional image of the sample object is displayed on a display monitor or the like based on such a detection result, since an area which is detected by mistake serves as a noise component, the quality of the image on the display monitor is degraded.

To deal with this, as means for eliminating a noise component, there is a method which requires to set a designated value of the light quantity in advance but to set the height position of the surface of the sample object as "0" when the light quantity is equal to or smaller than the designated value. However, according to this method, it is necessary to determine in which manner the designated value is set and enter by executing an experiment which uses various types of sample objects prior to actual detection, for instance. Thus, this method has a problem that the processing prior to detection is complicated. Further, when the height position of the surface of the sample object is set as "0," a corresponding area in an image on the display monitor appears empty. Such a display is regarded as showing nothing but a through hole, that is, regarded basically as not showing an accurate sample shape, which is not preferable.

Further, since the conventional three-dimensional detecting method cannot accurately detect the surface of the sample object as described above, it is impossible to accurately display the surface shape of the sample object.

SUMMARY OF THE INVENTION

The present invention is directed to a method of detecting a three-dimensional shape of a sample. The method comprises the steps of: a) detecting respective confocal images of the sample at different heights from the sample, to thereby obtain a plurality of light-intensity levels for each pixel at the different heights; b) comparing the plurality of light-intensity levels with each other to determine a maximum light-intensity level for each pixel; c) determining one of the different heights providing the maximum light-intensity to obtain a height value for each pixel; d) selecting an objective pixel among an arrangement of pixels on which each confocal image is defined; e) correcting the height value of the objective pixel -with correction values to obtain a corrected height value, wherein the correction values include the height value and the maximum light-intensity level of at least one neighboring pixel locating a neighborhood of the objective pixel; f) repeating the steps d) and e) while updating selection of the objective pixel among the arrangement of pixels to obtain a distribution of corrected height values; and g) determining the three-dimensional shape of the sample in accordance with the distribution of corrected height values.

The present invention is also directed to an apparatus for detecting a three-dimensional shape of a sample, comprising: a) image detector means for detecting respective confocal images of the sample at different heights from the sample, to thereby obtain a plurality of light-intensity levels for each pixel at the different heights; b) comparing means for comparing the plurality of light-intensity levels with each other to determine a maximum light-intensity level for each pixel; c) determination means for determining one of the different heights providing the maximum light-intensity to obtain a height value for each pixel; d) selecting means for selecting an objective pixel among an arrangement of pixels on which each confocal image is defined; e) correcting means for correcting the height value of the objective pixel with correction values to obtain a corrected height value, wherein the correction values include the height value and the maximum light-intensity level of at least one neighboring pixel locating a neighborhood of the objective pixel; f) repeating means for repeating the steps d) and e) while updating selection of the objective pixel among the arrangement of pixels to obtain a distribution of corrected height values; and g) shape-determination means for determining the three-dimensional shape of the sample in accordance with the distribution of corrected height values.

According to the present invention, confocal images are taken at a plurality of heights which are different from each other in the direction of height of a sample object, and based on the confocal images, a height position at which the quantity of light becomes maximum in the direction of height is determined as a surface height position. After calculating the quantity of light at the surface height position, with respect to each pixel, based on the surface height position and a maximum light quantity at peripheral pixels surrounding the pixel, the surface height position corresponding to this pixel is corrected and determined as surface information on the sample object corresponding to this pixel. Hence, it is possible to accurately detect a surface shape of the sample object without influenced by the existence of a slope portion in the sample object or the like.

Accordingly, an object of the present invention is to provide for a three-dimensional detecting method and a three-dimensional detecting apparatus with which it is possible to accurately detect a surface shape of a sample object.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B are schematic diagrams showing the operation of the three-dimensional detecting apparatus of FIG. 1;

FIG. 5 is a conceptual view showing a relationship between a height position D(j) and a corresponding confocal point image Fj;

FIG. 7 is a partial expanded view of FIG. 6;

DESCRIPTION OF THE PREFERRED EMBODIMENTS

Figure 1:
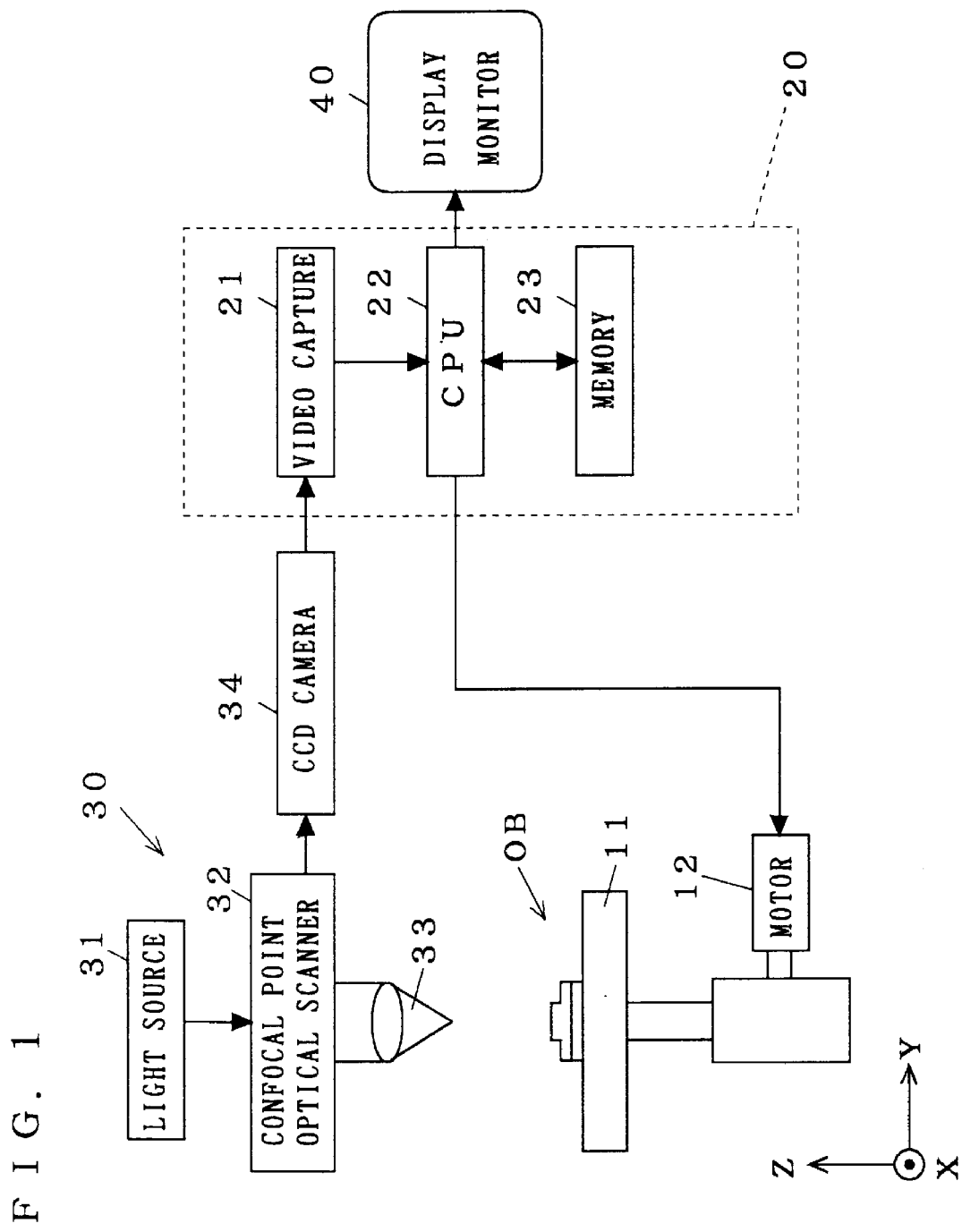
FIG. 1 is a view of a three-dimensional detecting apparatus according to a preferred embodiment of the present invention.

FIG. 1 is a view of a three-dimensional detecting apparatus according to a preferred embodiment of the present invention. In this three-dimensional detecting apparatus, a microscope stage 11 is disposed for free movement in a height direction Z and linked to a motor 12 which is driven in response to a signal obtained from a control part 20 which controls the entire apparatus. Hence, by appropriately controlling the motor 12 after mounting a sample object OB on a top surface of the microscope stage 11, the sample object OB can be positioned at an optional height in the height direction Z. Thus, in this preferred embodiment, the microscope stage 11 and the motor 12 constitute moving means which positions the sample object OB at a plurality of heights which are different from each other in the height direction Z.

Further, a pickup unit 30 for taking a confocal point image of the sample object OB is disposed above the microscope stage 11. The pickup unit 30 is comprised of a light source 31 such as a xenon lamp, a confocal point optical scanner 32, an objective lens 33, and a CCD camera 34. The pickup unit 30 takes a confocal point image at a horizontal plane XY of the sample object OB which is positioned at a predetermined height position in the manner described above, by means of the CCD camera 34, and supplies an analog image signal regarding the confocal point image to a video capture 21 of the control part 20.

In the control part 20, the analog image signal supplied to the video capture 21 is converted into a digital signal and supplied to a CPU 22 for a three-dimensional detection process which will be described in detail later. The CPU 22 is connected to the motor 12 through an input/output port not shown. While positioning the sample object OB at heights which are different from each other in the height direction Z by controlling the motor 12, confocal point images at the horizontal plane XY at the respective height positions are taken, and based on the plurality of the confocal point images, surface information which expresses a surface of the sample object OB and internal information which expresses an internal structure of the sample object OB are obtained by the three-dimensional detection process which will be described later. Thus, in this preferred embodiment, the control part 20 functions as peak position detecting means and surface information determining means for determining the surface information regarding the sample object OB. Further, the CPU 22 is also connected to a display monitor 40 through the input/output port, so that a surface shape or a cross-sectional shape of the sample object OB is displayed on the display monitor 40 based on the surface information or the internal information. In FIG. 1, denoted at 23 is a memory for temporarily storing image data, a program for executing the three-dimensional detection process which will be described later, etc.

Although the pickup unit 30 is fixed and the microscope stage 11 is moved in the height direction Z in this preferred embodiment, the microscope stage 11 may be fixed and the pickup unit 30 or the objective lens 33 may be moved in the height direction Z, in which case as well it is possible to take the plurality of the confocal point images of the sample object OB at different heights.

Figure 2:
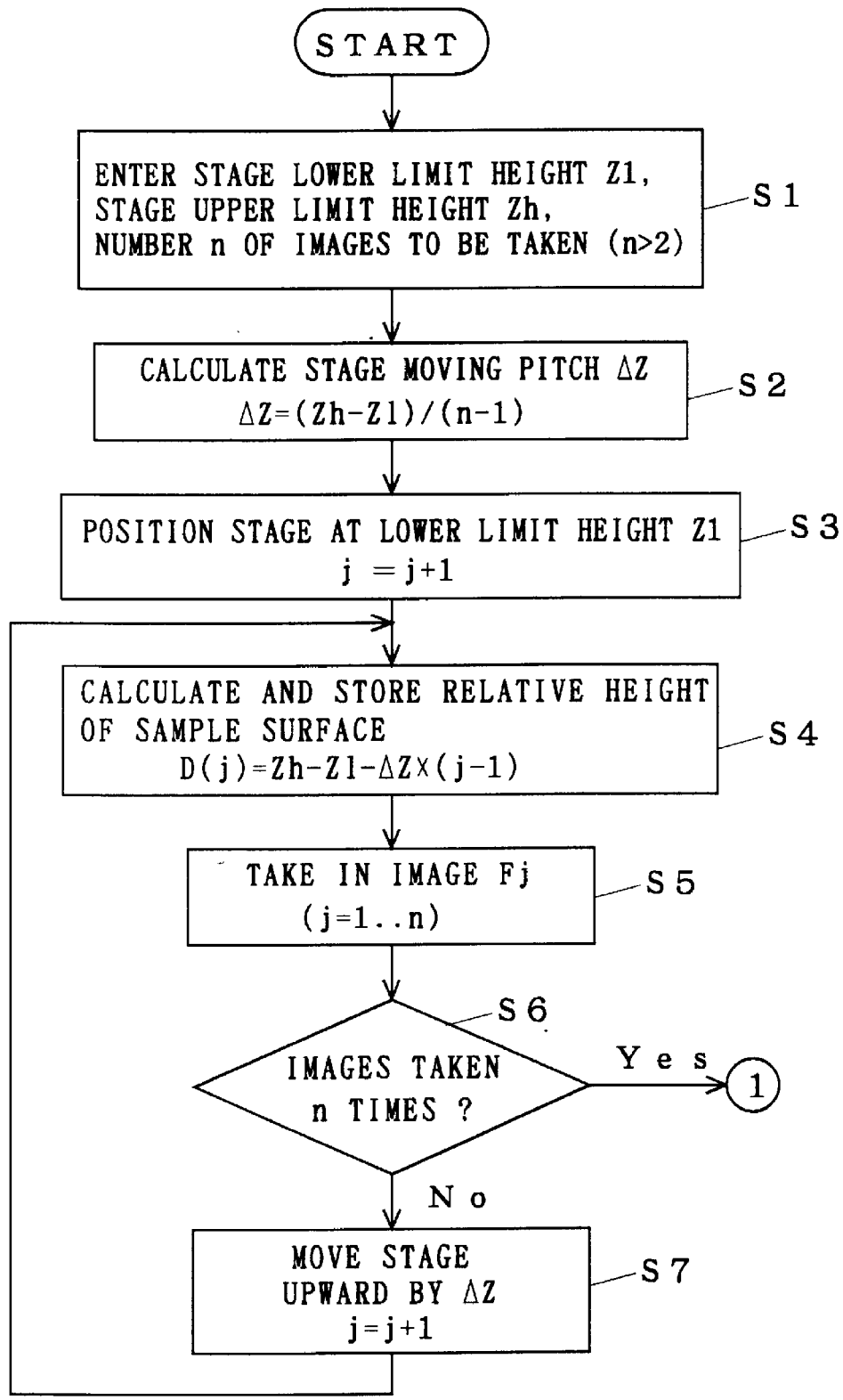
FIGS. 2 and 3 are flow charts showing an operation of the three-dimensional detecting apparatus of FIG. 1.
Figure 3:
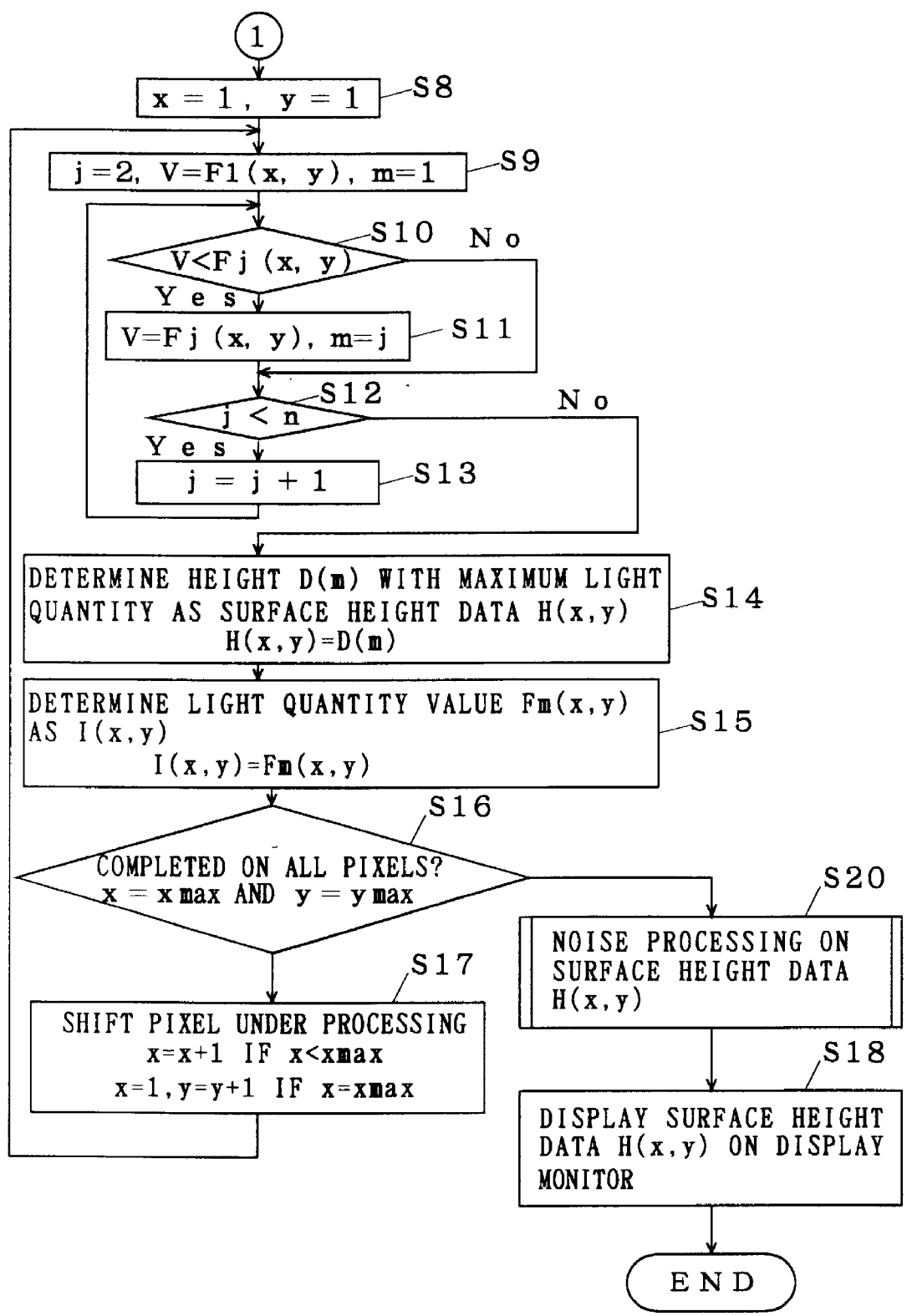

FIGS. 2 and 3 are flow charts showing an operation of the three-dimensional detecting apparatus which is constructed as described above.

First, an operator enters a lower limit height Z1 and a upper limit height Zh of the stage and the number n of image-to-be-taken (n>2), through a key board (not shown) which is disposed to the control part 20 (Step S1). As herein termed, "the number n of image-to-be-taken" is a value which denotes at which step the microscope stage 11 is positioned when confocal point images of the sample object OB are taken at the respective heights.

The value which is obtained at Step S1 is substituted in the following formula:

$$\Delta Z = (Zh - Z1)/(n-1)$$

whereby a stage moving pitch $\Delta Z$ is calculated and stored in the memory 23 (Step S2).

Following this, a drive instruction signal is supplied to the motor 12 from the control part 20 so that the microscope stage 11 is positioned at the lower limit height Z1 (i.e., height position D(1)) (See FIG. 4A), while a count j is initialized to "1"(Step S3). The count j is related to the height position of the microscope stage 11, and is an integer from "1" and "n."

Next, while positioning the microscope stage 11 at heights which are different from each other within the range between the lower limit height Z1 and the upper limit height Zh by executing Step S4 to Step S7 n times, confocal point images Fj at the horizontal plane XY at the respective height positions are taken and stored in the memory 23. That is, a relative height position D(j) of the sample object OB is calculated at Step S4, from the following formula:

$$D(j) = Zh - Z1 - \Delta Z \cdot (j-1)$$

Further, the confocal point image Fj at that height position D(j) is taken and stored in the memory 23 at Step S5. This is conceptually illustrated in FIG. 5. For instance, a confocal point image F1 is taken and stored in the memory 23 at the lower limit height D(1), a confocal point image F2 is taken and stored in the memory 23 at the height D(2), and a confocal point image Fn is taken and stored in the memory 23 at the upper limit height D(n) shown in FIG. 4B. At Step S6, whether images are taken n times is judged. As long as it is judged "NO" at Step S6, the microscope stage 11 is moved upward by the stage moving pitch $\Delta Z$ while incrementing the count j by "1" at Step S7. Conversely, if it is judged "YES" at Step S6, the sequence exits the processing loop from Step S4 to Step S7 and proceeds to Step S8.

At Step S8, counter values x, y, which denote X-coordinate and Y-coordinate of a plurality of pixels which form a confocal point image, are initialized to "1," "1."

At Step S9, counts j, m are respectively initialized to "2," "1" while a light quantity (i.e. light-intensity level) F1(x, y) at the pixel (x, y) of the confocal point image F1 is supplied as a comparison value V. The count m is a value which denotes a height position at which the light quantity becomes maximum at the pixel (x, y), and is calculated in a manner described in the following. A height position D(m) with the count m is surface height data H(x, y) corresponding to the pixel (x, y). The light quantity at this position is a maximum light quantity I(x, y) corresponding to the pixel (x, y).

At Step S10, a light quantity Fj(x, y) at the pixel (x, y) of the confocal point image Fj is larger than the comparison value V is judged. If it is judged "YES" here, after updating the comparison value V to Fj(x, y) and coinciding the count m with the count j (Step S11) the sequence proceeds directly to Step S12 without executing Step S11.

Following this, at Step S12, whether the count j is smaller than the number n of taken images which are entered at Step S1 is judged. As long as it is judged "YES," after the count j is incremented by "1" at Step S13, the processing of Step S10 and Step S11 is repeated. Thus, by repeating Step S10 to Step S13, a height position at which the light quantity is maximum for the pixel (x, y), i.e., the surface height position is calculated (surface height position determining process). Conversely, if it is judged "NO" at Step S12, the sequence exits from the surface height position determining process and Step S14 is executed.

At Step S14, the surface height D(m) with the count m which is calculated in the manner described above is supplied to the surface height data H(x, y) which expresses the surface height position. Further, at Step S15, a light quantity Fm(x, y) at the surface height D(m) is supplied to the maximum light quantity I(x, y). In this manner, the surface height data H(x, y) and the maximum light quantity I(x, y) regarding the pixel (x, y) are obtained.

Figure 6:
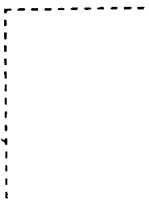
FIG. 6 is a conceptual view showing surface height data H(x, y) and a maximum light intensity I(x, y) stored in a memory.

At Step S16, whether x=xmax and y=ymax are both satisfied, that is, whether the processing from Step S9 to Step S15 (i.e., the process of obtaining the surface height data H(x, y) and the maximum light quantity I(x, y) regarding the pixel (x, y)) is completed on all pixels (x, y) is judged. As long as it is judged "NO" at Step S16, the process above (Step S9 to Step S15) is repeated after appropriately setting counts (coordinate values) x, y at Step S17 and thereby shifting a pixel which is under processing. In this manner, the surface height data H(x, y) which expresses the surface height position of the sample object OB and the maximum light quantity I(x, y) are obtained regarding all pixels (x, y), and stored for each pixel in the memory 23 in the form below while correlated to the pixels as shown in FIG. 6:

H(1, 1), I(1, 1),
H(1, 2), I(1, 2),
. . .
H(xmax, ymax), I(xmax, ymax),

A data region DR in FIG. 6 is shown as expanded in FIG. 7.

Next, noise processing is performed on the surface height data H(x, y) which are obtained in the manner described above (Step S20). This noise processing is processing in which at least one or more peripheral pixels surrounding a pixel (hereinafter "pixel under noise processing") are selected and the surface height data at the pixel under noise processing are corrected based on the surface height data and the maximum light quantity at the selected peripheral pixels. This will be described in detail with reference to FIG. 8.

Figure 8:
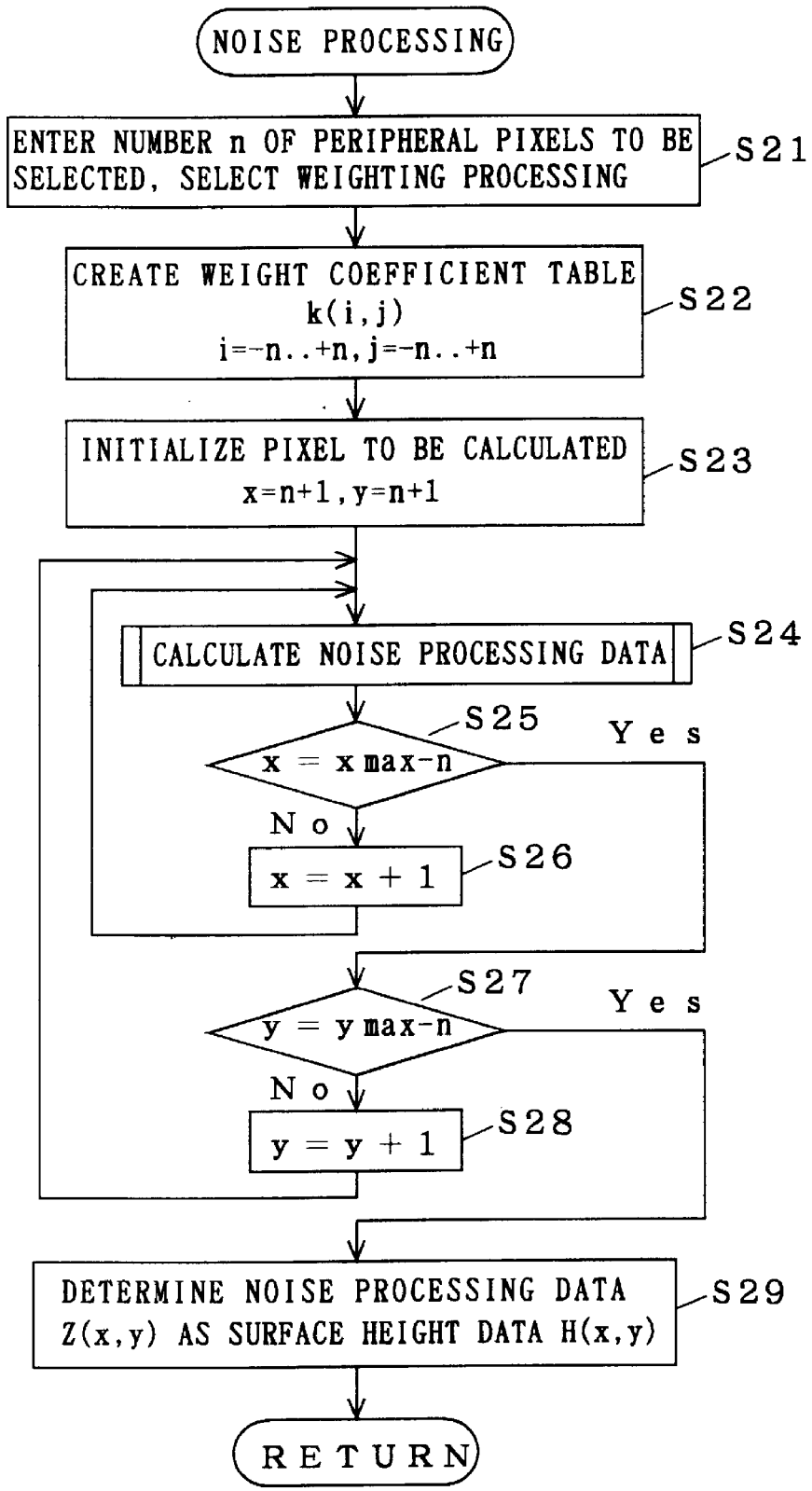
FIG. 8 is a flow chart showing noise processing on surface height data H(x, y)

FIG. 8 is a flow chart showing the noise processing on the surface height data H(x, y). In this preferred embodiment, first at Step S21, the number n of peripheral pixels to be selected by an operator, e.g., "1" is entered. As shown in FIG. 7, eight peripheral pixels (x-1, y-1), (x, y-1), (x+1, y-1), (x-1, y), (x+1, y), (x-1, y+1), (x, y+1), (x+1, y+1) are selected consequently and the surface height data and the maximum light quantities at these peripheral pixels, i.e., H(x-1, y-1), I(x-1, y-1),
H(x, y-1), I(x, y-1),
H(x+1, y-1), I(x+1, y-1),
H(x-1, y), I(x-1, y),
H(x+1, y), I(x+1, y),
H(x-1, y+1), I(x-1, y+1),
H(x, y+1), I(x, y+1),
H(x+1, y+1), I(x+1, y+1),
are read from the memory 23.

Further, at Step S21, an operator selects not only the number n of peripheral pixels but weighting as well. As herein termed, "weighting" is processing for correcting the surface height data H(x, y) at the pixel under noise processing (x, y) based on a distance from the pixel under noise processing (x, y) to each peripheral pixel while considering the degree of contribution of the peripheral pixels to the pixel under noise processing (x, y). In this preferred embodiment, four options of a) not to perform weighting and b)–d) to perform first to third weighting are prepared and on be selected. The contents of each weighting processing will be described in detail later.

In response to selection of the type of weighting, a weight coefficient k(i, j) is calculated, and a table showing the weight coefficient k(i, j) is created and stored in the memory 23 at Step S22.

Next, counts x, y respectively indicating X-coordinate and Y-coordinate of the pixel under noise processing are respectively initialized to "n+1," "n+1" (Step S23). Noise processing data are thereafter calculated (Step S24).

Figure 9:
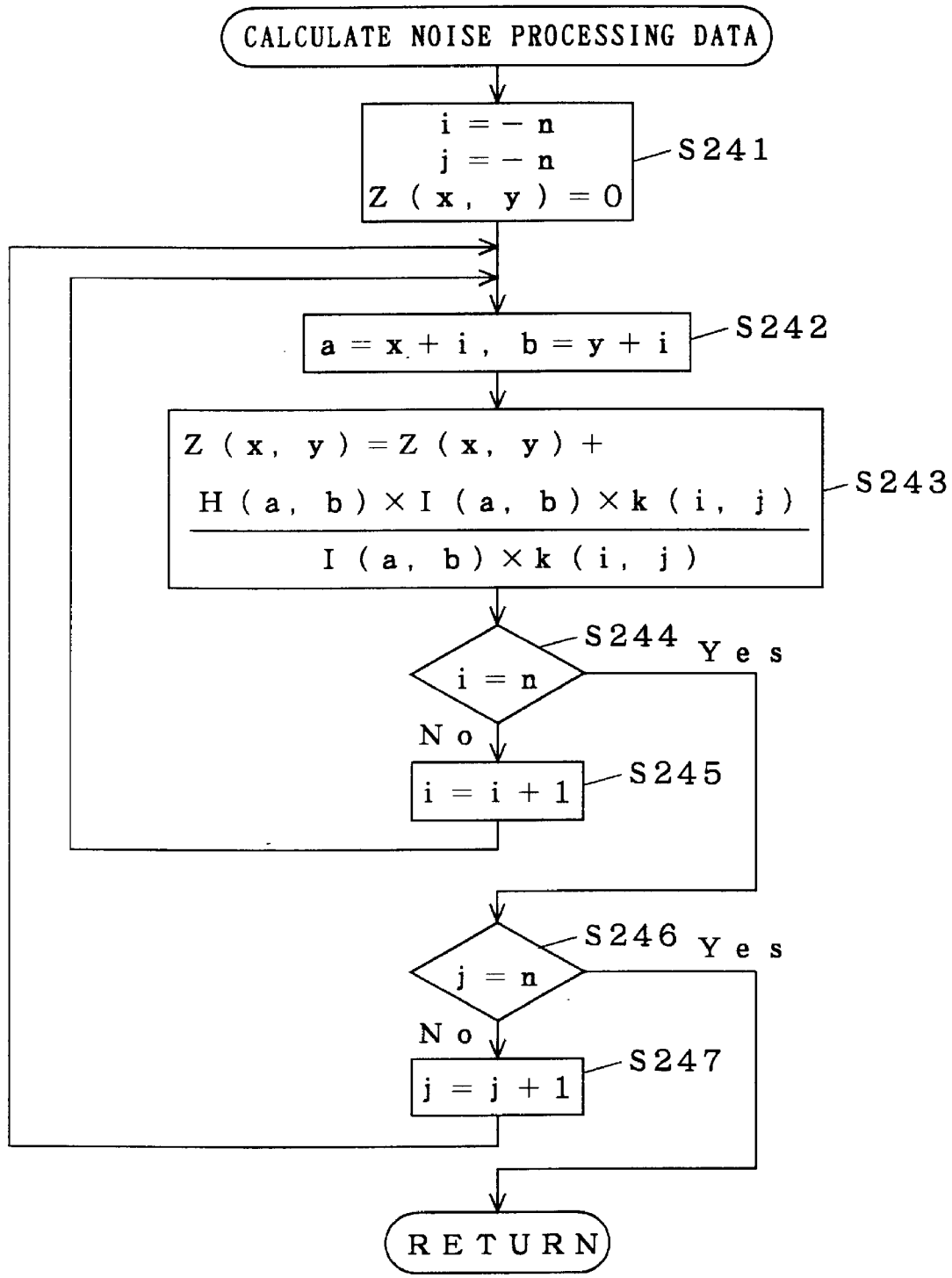
FIG. 9 is a flow chart showing calculation of noise processing data.

FIG. 9 is a flow chart showing calculation of noise processing data. Here, first, the counts i, j are each initialized to "-n" while noise processing data Z(x, y) are initialized to "0" (Step S241).

Step S242 to Step S247 are then executed, whereby data calculation based on:

$$Z(x,y) = \sum_{i=-n}^{+n} \sum_{j=-n}^{+n} (H(x+i, y+j) \times I(x+i, y+j) \times k(i,j)) / \sum_{i=-n}^{+n} \sum_{j=-n}^{+n} (I(x+i, y+j) \times k(i,j))$$  Eq. 1 is performed. As described above, the following four types of the weight coefficient k(i, j):

a) not to perform weighting,
k(i, j)=1, b) first weighting; uses an inverse number of the square of a distance from a pixel under noise processing as a weight coefficient, $$k(i, j) = q/(i^2 + j^2)$$  Eq. 2 where q is a constant between 0.01 and 1.0 c) second weighting; uses an inverse number of the absolute value of a distance from a pixel under noise processing as a weight coefficient, $$k(i, j) = q/(|i| + |j|)$$  Eq. 3 d) third weighting; uses an inverse number of the maximum value of a distance from a pixel under noise processing as a weight coefficient, $$k(i, j) = q/\max(i, j)$$  Eq. 4 are prepared. A proper weight coefficient k(i, j) is used in accordance with selection at Step S21.

In other words, data calculation above is carried out in the following manner.

At Step S242, as counts a, b indicating X-coordinates, Y-coordinates of the pixel under noise processing and the peripheral pixels, "x+i," "y+j" are supplied. At Step S243, the surface height data H(a, b), the maximum light quantity I(a, b), and the weight coefficient k(i, j) corresponding to the pixel (a, b) are read from the memory 23. Based on the following formula, $$Z(x,y) = Z(x,y) + \frac{H(a,b) \times I(a,b) \times k(a,b)}{I(a,b) \times k(a,b)}$$  Eq. 5 the noise processing data Z(x, y) are obtained. In the right-hand side of the equation, the first term indicates a value of the noise processing data Z(x, y) immediately before calculation at Step S243, while the second term indicates a value which shows an influence of the peripheral pixels (a, b) on the surface height data H(a, b) at the pixel under noise processing (x, y).

Following this, whether the count i coincides with the number n of peripheral pixels is judged at Step S244. While judgement remains "NO," the count i is incremented by "1" at Step S245 and the sequence returns to Step S242.

On the other hand, if it is judged "YES" at Step S244, the sequence proceeds to Step S246 to judge whether count j coincides with the number n of peripheral pixels. While judgement remains "NO," the count j is incremented by "1" at Step S247 and the sequence returns to Step S242.

Thus, by repeating the processing loop from Step S242 to Step S247 until both the counts i, j reach the number n of peripheral pixels, an influence of the peripheral pixels over the surface height data H(x, y) at the pixel under noise processing (x, y) is added, and therefore, the surface height data H(x, y) are corrected.

For instance, when "1" is entered as the number n of peripheral pixels as described above, the following eight pixels are selected as peripheral pixels (a, b):

(x−1, y−1),
(x, y−1),
(X+1, y−1),
(x−1, y),
(x+1, y),
(x−1, y+1),
(x, y+1),
(x+1, y+1)

Every time calculation is executed at Step S243, combinations of data as below:

H(x−1, y−1), I(x−1, y−1), k(−1, −1),
H(x, y−1), I(x, y−1), k(0, −1),
H(x+1, y−1), I(x+1, y−1), k(1, −1),
H(x−1, y), I(x−1, y), k(−1, 0),
H(x+1, y), I(x+1, y), k(0, 0),
H(x−1, y+1), I(x−1, y+1), k(1, 0),
H(x, y+1), I(x, y+1), k(−1, 1),
H(x+1, y+1), I(x+1, y+1), k(1, 1), are read from the memory 23 and substituted in Eq. 5 as H(a, b), I(a, b), k(i, j), whereby the noise processing data Z(x, y) are calculated. Upon calculation of the noise processing data in this manner, the noise processing data Z(x, y) are stored in the memory 23, and the sequence proceeds to Step S25.

The description on the noise processing will be continued with reference back to FIG. 8. Whether the count x is xmax−n is judged at Step S25. While judgement remains "NO," the count x is incremented by "1" at Step S26, and the sequence returns to Step S24 to execute data calculation described above.

When it is judged "YES" at Step S25, the sequence proceeds to Step 27 and it is judged whether the count y is ymax−n. While it is judged "NO", the count x is incremented by "1" at Step S26, and the sequence returns to Step S24 to execute data calculation described above.

When it is judged "YES" at Step S27, the noise processing data Z(x, y) which are calculated in the manner described above are rewritten as the corrected surface height data H(x, y).

Thus, in this preferred embodiment, since the surface height data H(x, y) at the pixel under noise processing (x, y) are corrected based on the surface height data H(a, b) and the maximum light quantity I(a, b) at the peripheral pixels (a, b) surrounding the pixel under noise processing (x, y), it is possible to accurately detect a surface shape of the sample object OB while eliminating an influence by a noise.

Figure 10:
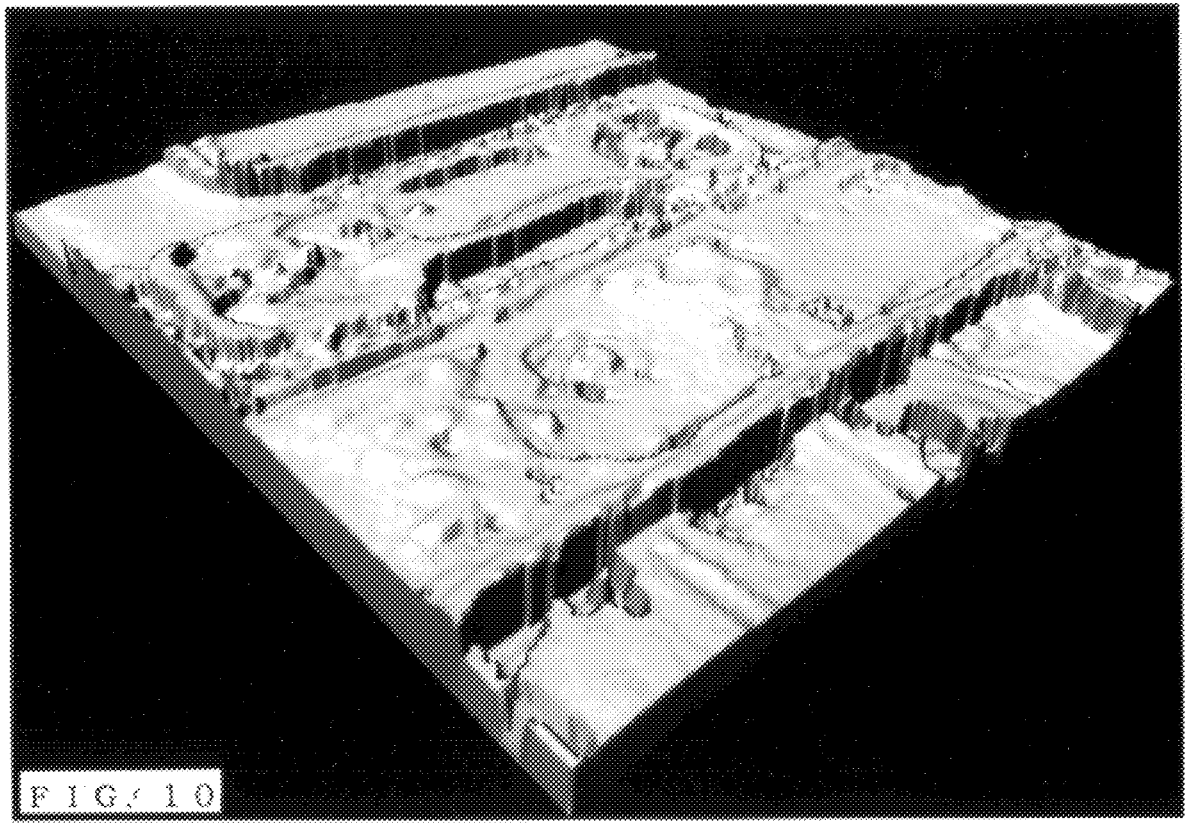
FIG. 10 is a view of an example of a surface shape of a sample object which is displayed in a display monitor shown in FIG. 1.

Once the surface height data H(x, y) of the sample object OB are calculated, the sequence proceeds to Step S18 of FIG. 3 at which marks expressing the surface of the sample object are put on in correspondence to the respective pixels based on the surface height data H(x, y) which are obtained in the manner described above, whereby a surface shape of the sample object OB is displayed on the display monitor 40. FIG. 10 shows an example of the surface shape which is drawn on the display monitor 40.

Thus, in this preferred embodiment, not only the surface information regarding the sample object OB, i.e., the surface height data H(x, y) is simply calculated to perform the three-dimensional detection on the sample object OB, but also the surface shape of the sample object OB is displayed on the display monitor 40 based on the surface information. Therefore, an operator or the like can visually and easily grasp the surface shape of the sample object OB.

Although "1" is entered as the number n of peripheral pixels and eight pixels neighboring the pixel under noise processing (x, y) are selected as peripheral pixels as shown in FIG. 7 in the preferred embodiment above, selection of peripheral pixels is not limited to such. Rather, selection is optional in that it is possible to select at least one or more pixels among those surrounding the pixel under noise processing (x, y).

Further, in the preferred embodiment above, since the eight pixels neighboring the pixel under noise processing (x, y) are selected as peripheral pixels, noise processing using peripheral pixels is not performed on a pixel under noise processing such as (1, 1) and (1, 2) which does not have eight neighboring pixels. However, needless to mention, it is allowable to select one or more peripheral pixels and perform noise processing utilizing the selected peripheral pixels.

While the invention has been described in detail, the foregoing description is in all aspects illustrative and not restrictive. It is understood that numerous other modifications and variations can be devised without departing from the scope of the invention.

I claim:

1. A method of detecting a three-dimensional shape of a sample, comprising the steps of:

a) detecting respective confocal images of said sample at different heights from said sample, to thereby obtain a plurality of light-intensity levels for each pixel at said different heights;

b) comparing said plurality of light-intensity levels with each other to determine a maximum light-intensity level for each pixel;

c) determining one of said different heights providing said maximum light-intensity to obtain a height value for each pixel;

d) selecting an objective pixel among an arrangement of pixels on which each confocal image is defined;

e) correcting said height value of said objective pixel with correction values to obtain a corrected height value, wherein said correction values include said height value and said maximum light-intensity level of at least one neighboring pixel locating a neighborhood of said objective pixel;

f) repeating the steps d) and e) while updating selection of said objective pixel among said arrangement of pixels to obtain a distribution of corrected height values; and g) determining said three-dimensional shape of said sample in accordance with said distribution of corrected height values.

2. The method of claim 1, wherein the step e) comprises the steps of e-1) determining a plurality of neighboring pixels serving as said at least one neighboring pixel, e-2) determining weight values for said plurality of neighboring pixels in response to respective distances between said objective pixel and said plurality of neighboring pixels, respectively, and e-3) calculating a weighted average of respective height values for said plurality of neighboring pixels using said weight values to obtain said corrected height value.

3. The method of claim 2, wherein the step e-2) comprises the step of calculating products of respective maximum intensity levels and respective distances between said objective pixel and said plurality of neighboring pixels, to obtain said weight values.

4. The method of claim 2, wherein the step e-2) comprises the steps of selecting one rule among a plurality of rules for determining said weights previously determined, and calculating said weight values in accordance with said one rule selected.

5. The method of claim 4, wherein said plurality of rules comprises a first rule of setting all of said weight values at one, and at least one other rule of setting said weight values in reversely proportion to indexes representing respective distances between said objective pixel and said plurality of neighboring pixels, respectively.

6. The method of claim 5, wherein said at least one other rule comprises a second rule of setting said indexes in reversely proportion to a square of said respective distances, respectively, a third rule of setting said indexes in reversely proportion to a sum of absolute discrepancies between said objective pixel and said plurality of neighboring pixels in two directions defined on a two-dimensional coordinates, respectively, and a fourth rule of setting said indexes in reversely proportion to a maximum one of said absolute discrepancies, respectively.

7. The method of claim 1, wherein the step g) comprises the step of g-1) graphically displaying said three-dimensional shape of said sample.

8. An apparatus for detecting a three-dimensional shape of a sample, comprising:

a) image detector means for detecting respective confocal images of said sample at different heights from said sample, to thereby obtain a plurality of light-intensity levels for each pixel at said different heights;

b) comparing means for comparing said plurality of light-intensity levels with each other to determine a maximum light-intensity level for each pixel;

c) determination means for determining one of said different heights providing said maximum light-intensity to obtain a height value for each pixel;

d) selecting means for selecting an objective pixel among an arrangement of pixels on which each confocal image is defined;

e) correcting means for correcting said height value of said objective pixel with correction values to obtain a corrected height value, wherein said correction values include said height value and said maximum light-intensity level of at least one neighboring pixel locating a neighborhood of said objective pixel;

f) repeating means for repeating the steps d) and e) while updating selection of said objective pixel among said arrangement of pixels to obtain a distribution of corrected height values; and g) shape-determination means for determining said three-dimensional shape of said sample in accordance with said distribution of corrected height values.

9. The apparatus of claim 8, wherein the correcting means comprises e-1) means for determining a plurality of neighboring pixels serving as said at least one neighboring pixel, e-2) weight determination means for determining weight values for said plurality of neighboring pixels in response to respective distances between said objective pixel and said plurality of neighboring pixels, respectively, and e-3) means for calculating a weighted average of respective height values for said plurality of neighboring pixels using said weight values to obtain said corrected height value.

10. The apparatus of claim 9, wherein said weight determination means comprises means for calculating products of respective maximum intensity levels and respective distances between said objective pixel and said plurality of neighboring pixels, to obtain said weight values.

11. The apparatus of claim 9, wherein said weight determination means comprises means for selecting one rule among a plurality of rules for determining said weights previously determined, and means for calculating said weight values in accordance with said one rule selected.

12. The apparatus of claim 11, wherein said plurality of rules comprises a first rule of setting all of said weight values at one, and at least one other rule of setting said weight values in reversely proportion to indexes representing respective distances between said objective pixel and said plurality of neighboring pixels, respectively.

13. The apparatus of claim 12, wherein said at least one other rule comprises a second rule of setting said indexes in reversely proportion to a square of said respective distances, respectively, a third rule of setting said indexes in reversely proportion to a sum of absolute discrepancies between said objective pixel and said plurality of neighboring pixels in two directions defined on a two-dimensional coordinates, respectively, and a fourth rule of setting said indexes in reversely proportion to a maximum one of said absolute discrepancies, respectively.

14. The apparatus of claim 8, wherein said shape-determination means comprises g-1) means for graphically displaying said three-dimensional shape of said sample.

* * * * *